(12) United States Patent
Tracy

(10) Patent No.: US 7,397,355 B2
(45) Date of Patent: Jul. 8, 2008

(54) REVERSIBLY MOUNTABLE ACCELERATION/DE-ACCELERATION WARNING LIGHT

(76) Inventor: Randy Lee Tracy, 976 E. Hyland Lake Dr., Murray, UT (US) 84121-1609

( * ) Notice: Subject to any disclaimer, the term of this patent is extended or adjusted under 35 U.S.C. 154(b) by 283 days.

(21) Appl. No.: 11/411,298

(22) Filed: Apr. 26, 2006

(65) Prior Publication Data

US 2007/0008096 A1    Jan. 11, 2007

Related U.S. Application Data

(60) Provisional application No. 60/680,568, filed on May 14, 2005.

(51) Int. Cl.
*B60Q 1/50* (2006.01)
(52) U.S. Cl. .................. 340/467; 340/468; 340/472
(58) Field of Classification Search ................ 340/463, 340/464, 467, 468, 469, 471, 472, 473, 476, 340/479; 307/10.8
See application file for complete search history.

(56) References Cited

U.S. PATENT DOCUMENTS

| 3,364,384 | A | | 1/1968 | Dankert |
| 3,491,336 | A | | 1/1970 | Anderson |
| 3,634,792 | A | * | 1/1972 | Blomenkamp et al. ...... 340/464 |
| 3,665,392 | A | | 5/1972 | Annas |
| 3,908,144 | A | | 9/1975 | Rudd |
| 4,713,732 | A | | 12/1987 | Schamblin |
| 4,837,554 | A | | 6/1989 | Gianforcaro |
| 5,164,701 | A | * | 11/1992 | Nan-Mu et al. ............. 340/464 |
| 5,258,740 | A | | 11/1993 | Viano et al. |
| 5,373,426 | A | | 12/1994 | O'Sullivan |
| 5,537,091 | A | | 7/1996 | Hull et al. |
| 5,680,101 | A | | 10/1997 | Pitcher |
| 5,758,944 | A | | 6/1998 | Jandron |
| 5,798,691 | A | | 8/1998 | Kao |
| 5,966,073 | A | | 10/1999 | Walton |
| 6,864,787 | B1 | * | 3/2005 | Veach ......................... 340/479 |
| 2002/0138118 | A1 | | 9/2002 | Mori et al. |
| 2005/0174228 | A1 | * | 8/2005 | Lin ............................. 340/467 |
| 2006/0125615 | A1 | * | 6/2006 | Song ........................... 340/463 |
| 2006/0125616 | A1 | * | 6/2006 | Song ........................... 340/463 |

* cited by examiner

*Primary Examiner*—Van T. Trieu
(74) *Attorney, Agent, or Firm*—Marcus G. Theodore

(57) ABSTRACT

A reversible front or rear mounted vehicle warning light system employing an accelerometer circuit to control the initiation of warning lights to indicate if a vehicle is accelerating or de-accelerating or losing traction in turns, or providing advertising messages on demand.

21 Claims, 20 Drawing Sheets

Fig 12

ADVERTISEMENT

REVERSIBLY MOUNTABLE ACCELERATION/DE-ACCELERATION WARNING LIGHT

RELATED APPLICATIONS

This application is a continuation-in-part application of the provisional patent application entitled "Reversibly Mountable Acceleration/De-acceleration Warning Light" filed May 14, 2005 and assigned Ser. No. 60/680,568.

BACKGROUND OF THE INVENTION

1. Field of Invention

The present invention relates to vehicles, bicycles, and truck and trailer pus scooters, snowmobiles, and boat warning lights. In particular, it relates to an interchangeable reversible front or rear mountable vehicle warning light indicating if a vehicle, bicycle, truck, or trailer is accelerating or de-accelerating.

2. Description of Related Art

Various front and rear mounted vehicle warning lights are known. O'Sullivan, U.S. Pat. No. 5,373,426 is a front mounted vehicle brake light for alerting pedestrians or other vehicle drives positioned in front of a vehicle that it is de-accelerating. Rudd, U.S. Pat. No. 3,908,144 discloses a sealed beam headlight with an additional brake light connected to the brake pedal of an automobile to not only provide forward illumination, but also signals operation of the braking system of the vehicle to those who can see the front of the vehicle. Both are difficult to be seen from the side, and do not indicate if the vehicle is accelerating. Dankert, U.S. Pat. No. 3,364,384, discloses a speed controlled signal system with a plurality of panels mounted to the front, back and side of a vehicle via a complex circuit to indicate whether a vehicle is accelerating or de-accelerating. Voano et al, U.S. Pat. No. 5,258,740 discloses front mounted cornering lamps selectively indicating brake and acceleration of a vehicle, which is visible from the front of a vehicle and one side. Gianfocaro, U.S. Pat. No. 4,837,554 discloses another speed controlled signal system with a plurality of panels mounted to the front, back and side of a vehicle via a complex circuit employing a motion switch using red and green lights to indicate whether a vehicle is accelerating or de-accelerating. Walton, U.S. Pat. No. 5,966,073 discloses front side and/or front mounted brake and running turn signal lights. Kao, U.S. Pat. No. 5,798,691 discloses an accessory LED brake light system secured to the front most central position of the automobile to provide warning signals when the automobile is braking to those positioned in front of the vehicle. Pitcher, U.S. Pat. No. 5,680,101 discloses a dash mounted forward facing brake light mounted within the passenger compartment. Anderson, U.S. Pat. No. 3,491,336 discloses a braking signal light mounted in the front of automotive vehicles with side windows. Annas, U.S. Pat. No. 3,665,392 discloses a brake light mounted to the front windshield of a motor vehicle. Hull et al., U.S. Pat. No. 5,537,091 discloses method of using existing wiring circuits of a vehicle to provide a pedestrian signal system for vehicles. Jandron, U.S. Pat. No. 5,758,944 discloses vehicle wrap around side/front brake lights. Schamblin, U.S. Pat. No. 4,713,732 discloses a vehicle light warning system employing a front mounted reflective sheet that flutters and moves in response to vehicle vibrations and/or wind during vehicle travel to be visible from oblique angles.

Mori et al., Pub. No. US 2002/0138181A1 is cited for general interest and discloses a vehicle expression operation control system for expressing an occupant's intention.

The present invention described below provides an interchangeable reversible front or rear mounted vehicle acceleration/de-acceleration warning light system employing a reversible accelerometer circuit, which is set to activate the warning light system depending upon whether it is mounted on the front or rear of a vehicle, bicycle, truck and/or trailer. It may also include black box components to track the vehicle speed, gravitational turn forces, as well as advertising light transmission components.

SUMMARY OF THE INVENTION

The present invention comprises a reversible front and/or rear mounted acceleration/de-acceleration warning light system to indicate the acceleration/de-acceleration of a vehicle, bicycle, and truck and/or trailer and any other moving transport devices, herein collectively referred to as vehicle. It has a base with attachment structure to secure to the front or rear of a vehicle, bicycle, truck and/or trailer, such as a magnetic base adapted to attach to metal bumpers or a removable clamp system. The base of the warning light system may be structured when the warning light system is preferably sold as a kit to removably mount to the front or rear of the vehicle. In the kit embodiment, the power source employed is a replaceable battery system interconnected via a wireless circuit or with wiring to the vehicle electrical system to selectively activate the lights during braking, acceleration and/or coasting. The kit circuitry preferably incorporates a circuit with an accelerometer and other electrical means to increase the intensity of the traveling signal as the speed of the vehicle increases, as well as activating different braking and acceleration/coasting signals.

A reflective mirror with reflective surfaces is attached to the base to amplify and direct light in a desired direction. A light source is attached to the base and positioned above the reflective mirror surfaces. This may include a laser light source discussed below to project advertising images on the ground. Light from the light source is then gathered by the reflective mirror surfaces for direction through a lens cover with facets. The lens cover preferably forms a weather tight seal with the base, and has facets aligned with the reflective mirror surfaces to direct light from the light source onto the ground in front of and along the front side of the vehicle. These facets may be etched or covered to emit a desired light pattern on the ground. The lens cover projects sufficiently from the base to be visible up to 180 degrees from the front and the side of the vehicle.

The light source is powered from a power source, such as the vehicle's battery and generator system, or an independent battery mounted within the base of the unit. A control circuit may be associated with the brakes, the accelerator and/or wheels (i.e. odometer circuit) to selectively activate the light source when the vehicle is de-accelerating or accelerating to provide a braking signal in a braking mode, and a traveling signal in a moving mode.

The light source is controlled by a circuit, which provides a different signal for braking or accelerating/coasting. This preferred circuit includes an accelerometer, which generates a different signal for acceleration and de-acceleration. The accelerometer is reversibly mounted to change the type of acceleration and de-acceleration signal generated based on whether the device is mounted on the front or rear of a vehicle. This is accomplished by appropriately reversing the accelerometer to generate the required signal for either front or rear mount operation. The preferred accelerometer used is a positive/negative output version that registers up to 2G of acceleration in both the forward and reverse axis directions. The initial "front mount" version of the acceleration warning light uses a non-linear amplifier section that biased the output of the accelerometer in favor of the "front" axis" positive acceleration in order to provide greater reading accuracy for forward motion. Reverse acceleration (used to detect braking activity) was consigned to the lower part of the amplifier range, in order to provide the A/D converter with approximately ¼ input signal range to reverse acceleration and ¼ for the input signal range for forward acceleration.

It is for this reason that a simple software change is insufficient to create a "rear-mount" version of the acceleration warning light. The input amplifier section is reengineered in order to essentially reverse the non-linear amplification range. The desired performance characteristics of the new amplifier would be to present the A/D converter with the upper ¼ of the range assigned to forward acceleration (which translates to reverse acceleration when the warning light is mounted backwards) and ¾ of the output range assigned to reverse acceleration (which translates to forward acceleration when the warning light is mounted backwards). This change requires the recalculation and swap-out of several resistor values in the original amplifier section.

The new A/D converter voltage range is then "reversed" using software such as that owned by Crazy Trazy LLC of Salt Lake City, Utah. This is done so that the software algorithm will perceive forward acceleration voltage as actually being reverse acceleration, and vice-versa The software also has to take the new numerical range coming from the A/D converter and place the forward/reverse "cutoff" point at ¾ of the full scale instead of the older ¼ of the full scale. This is because most of the sensitivity of the accelerometer amplifier is now devoted to reverse acceleration (which translates to forward acceleration when the warning light is mounted backward).

The circuit is operated on rechargeable battery power for use with bicycles. This requires that the older 12 kV to 5V regulator and associated circuitry be removed from the circuit board and bypassed for direct battery voltage use. This change involves the removal of the voltage regulator and the addition of wire jumpers to the original prototype boards used to interconnect to vehicle power circuits. The circuit board artwork may also be changed.

In addition, in order to reflect the lower acceleration potential of bicycles as compared to automobiles, there must be an alteration of the sensitivity of the accelerometer input data. This is accomplished via a software change of the circuit's computer I/O and Data Logging interface circuitry.

The circuitry may also be changed to alter the flashing frequency sequence if a single light source is used. Preferably, the light source has two different wavelength frequencies each separately associated with the vehicle brakes, accelerator, rpm indicator and/or odometer circuits to provide a braking signal different from the traveling signal. In one preferred embodiment, the wavelength frequency for braking is red, and the wavelength frequency for acceleration or coasting is green. The light source may comprise a single intense halogen type of light, or a plurality of electronic digital lights separately mounted in association with the facets of the lens cover.

The circuitry may also be manually activated with a switch when desired to provide a different light frequency or color sequence, if desired. For example, when employed on a child's bicycle, the child may elect to activate the lights in a programmed sequence or fully activated to provide an entertaining visual display and warning sequence when stopped or traveling.

In a preferred embodiment, the circuitry may also include black box components to track the vehicle speed, gravitational turn forces, and location. This information concerning the vehicle's travel may be stored within the circuitry, or transmitted to a remote receiving station for tracking and display. Use of the transmitting feature, is of particular use in the racing industry, where pit crews and fans can follow a driver's reactions through turns on the course. In addition, these tracking signals can be transmitted to other drivers on the course with receivers to display warning signals if a vehicle on the track is starting to lose control.

In another preferred embodiment, the facets of the lens cover are aligned to direct light beams onto the ground to form a pool of light along the front and front side of the vehicle as a pedestrian warning signal. The facets may also be structured to project a warning shaped pattern of light into a crosswalk to warn pedestrians. The shape of this embodiment has a distinctive lens to distinguish it from the front headlights, such as a diamond shape with facets in a V to direct light along the ground to illuminate in front and along the front side of the vehicle making it more visible to onlookers. This prevents the headlights from detracting from the braking/acceleration signals.

In one preferred embodiment, the lens cover facets are structured as prisms to more truly focus and direct light from the light source. In other variations, the lens cover itself acts as a multi-faceted prism.

In another preferred embodiment, the lens cover or mounting bracket includes mountings for interchangeable laser pens with patterned lenses to project an advertising slogan that illuminates the ground in front of the stopped vehicle with a message. These laser pens may include interchanging lenses, or may be periodically replaced with different messages by advertisers providing give away laser pens or lenses. These messages may be multi-colored or patterned to suit the needs of an advertiser, or user.

The present invention is therefore particularly adapted to be mounted on the front or rear of a vehicle, tow truck, bicycle, etc. to either provide vehicle braking and acceleration/or coasting warning signals and advertising signals to motorists, emergency vehicles, pedestrians, and spectators at racing events.

BRIEF DESRIPTION OF THE DRAWINGS

DESCRIPTION OF THE ILLUSTRATED EMBODIMENTS

Figure 1:
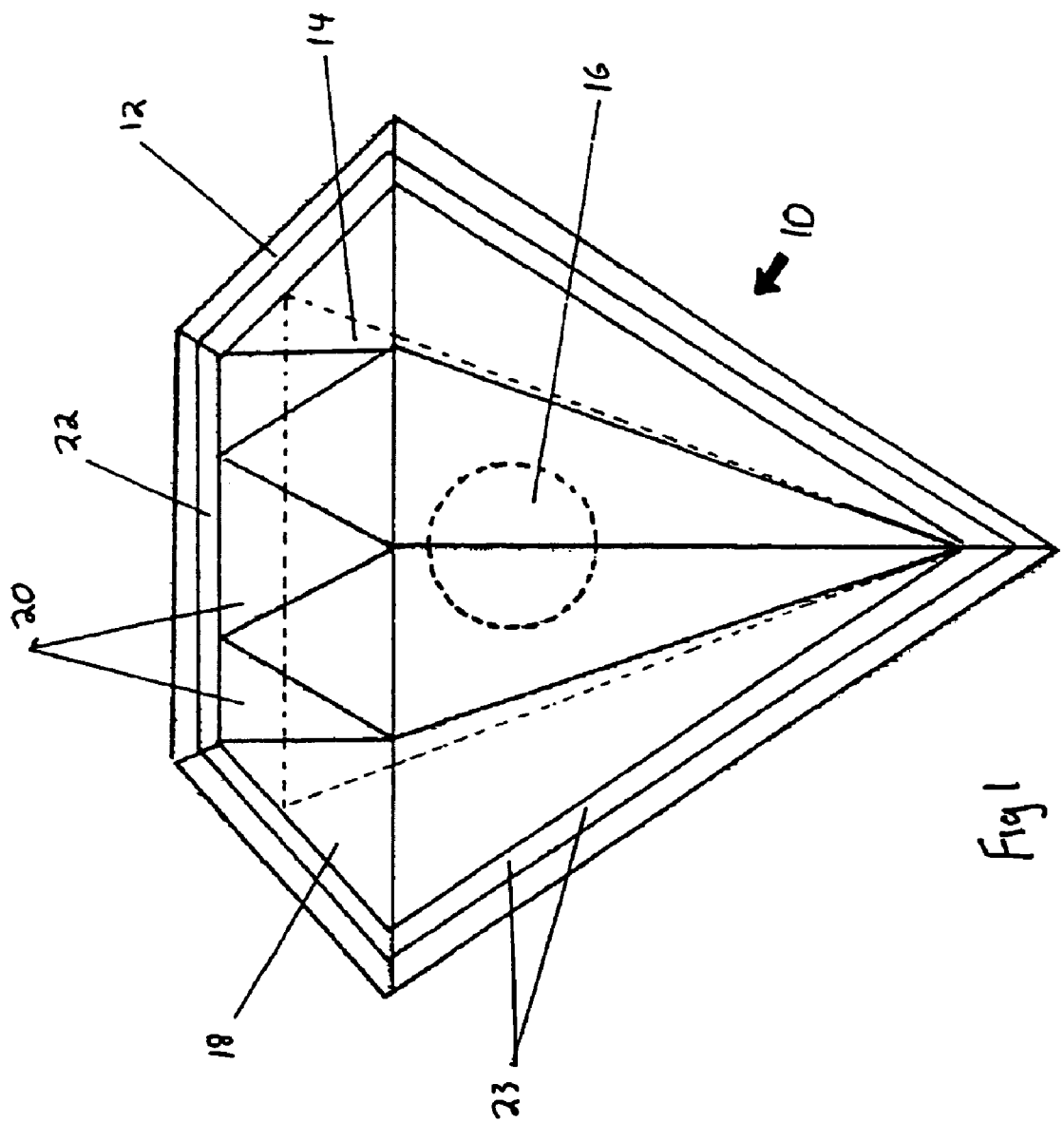
FIG. 1 is a front view of a preferred embodiment of the invention.
Figure 2:
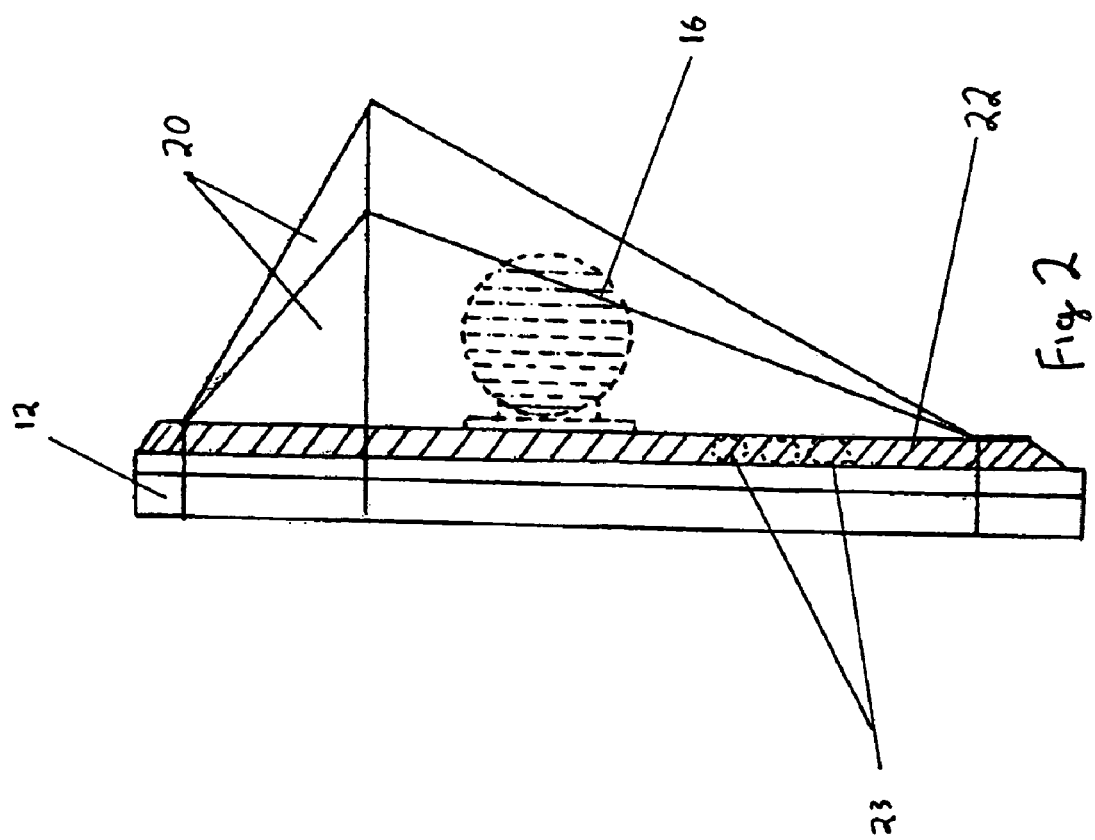
FIG. 2 is a side view of the embodiment of the invention shown in FIG. 1.
Figure 6:
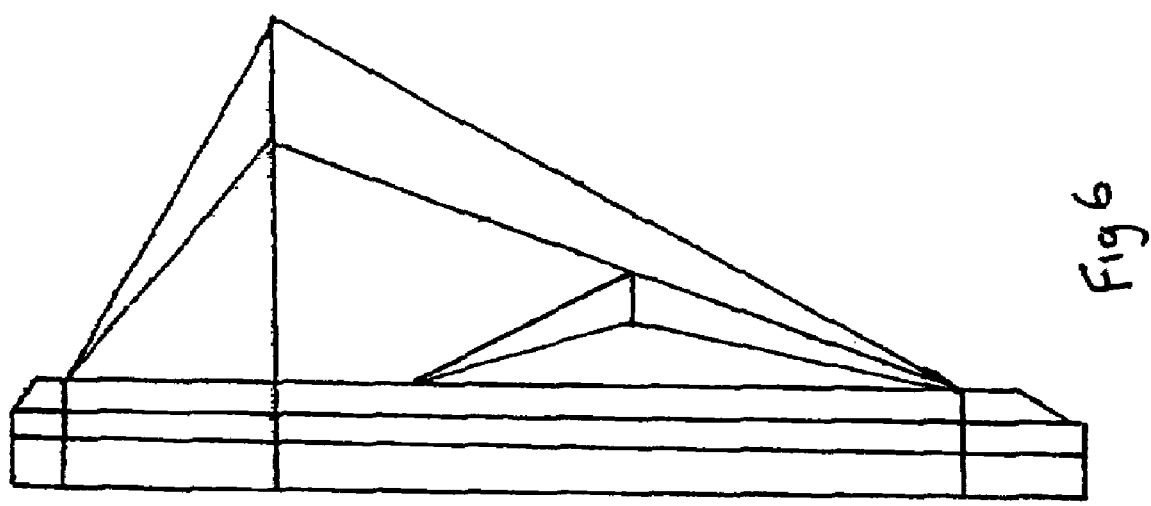
FIG. 6 is a side view of the embodiment of the invention shown in FIG. 5.
Figure 7:
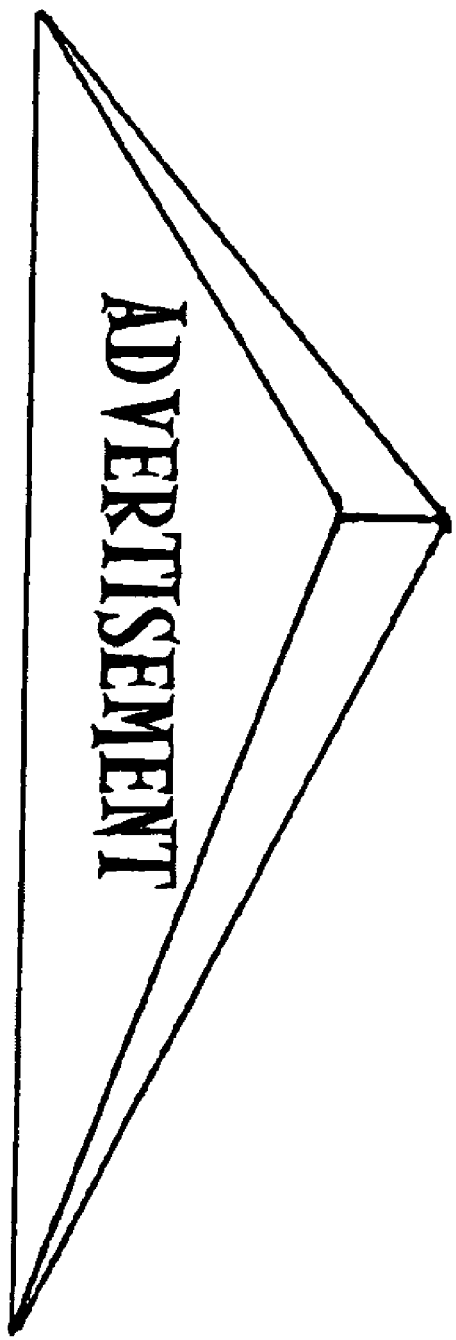
FIG. 7 is a perspective view of a facet of the lens shown in FIG. 5 to project a light pattern shape.
Figure 8:
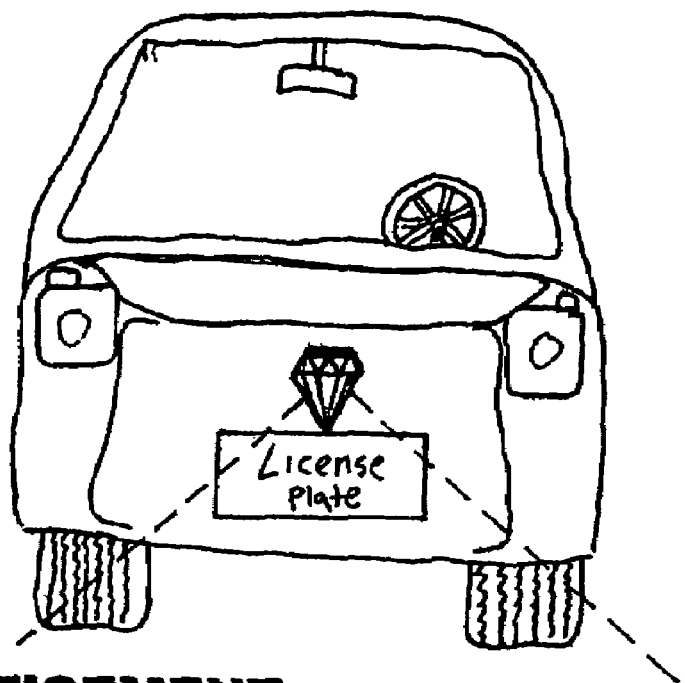
FIG. 8 is a front view of the embodiment of the preferred embodiment of the invention employing the lens show in FIG. 5 mounted to the front of an automobile.

FIGS. 1 through 8 disclose applicant's front and/or rear mounted vehicle acceleration/de-acceleration warning light system 10. FIG. 1 is a front view of a preferred embodiment of the invention 10. The present invention comprises a front and/or rear mounted interchangeable vehicle acceleration/de-acceleration warning light system 10. It has a flexible magnetic base 12 to secure to the front or rear of a ferromagnetic portion of a vehicle. Preferably, the magnetic base 12 is a shaping magnet capable of attaching to and molding to the shape of a bumper. A reflective mirror 14 with reflective surfaces is attached to the base 12 to amplify and direct light in a desired direction. A light source 16 is attached to the base 12 and positioned above the reflective mirror 14 surfaces. Light from the light source 16 is then gathered by the reflective mirror 14 surfaces for direction through a lens cover 18 with facets 20. The lens cover 18 forms a weather tight seal with the base 12. It has some of its facets 20 aligned with the reflective mirror 14 surfaces to direct light from the light source 16 onto the ground in front of the vehicle as shown in FIG. 8. The lens cover 18 is projects sufficiently from the base 12 to be visible up to 180 degrees or more from the front to the front sides, when mounted to the front of the vehicle. Alternatively, when mounted to the rear of the vehicle, it is visible from the rear to the rear sides of a vehicle.

FIG. 1 includes a second light source 22 attached along the perimeter of the base 12. This second light source 22 has green wavelength color frequency and is operably associated with the accelerator and or odometer to provide a green signal when the vehicle is accelerating and/or coasting. The first light source 16 is a red light and operably associated with the brakes to provide a red braking signal. An example of the first light source 16 comprises a single intense halogen type of light.

The second light source 22 comprises a plurality of green electronic digital lights 23 mounted along the perimeter of the base 12. It is associated with the vehicle's electrical circuit such that when the vehicle accelerates, the green digital lights 23 get proportionately brighter depending upon the vehicle speed. If mounted in front of the vehicle, this warns a pedestrian that a driver is trying to run a stoplight. Preferably the brightness of the digital lights 23 is scaled from 1 to 10. At freeway speeds, the brightness is reduced to an intensity of approximately a scale of 3 to prevent the lights from wearing out prematurely or interfering with other drivers.

Both light sources 16, 22 are covered by a transparent clear lens cover 18, whose facets 22 direct light in the desired direction. It is replaceable and can be interchanged with other lens colors and patterns to suit the preference of a user.

The light source is powered from a power source, such as the vehicle's battery and generator system (not shown), or an independent battery (not shown) mounted within the base 12 of the unit. A control circuit (not shown, but similar to those discussed in the prior art section) is associated with the brakes and the accelerator or odometer circuit to selectively activate the light sources 16, 22 when the vehicle is de-accelerating or accelerating to provide a braking signal in a braking mode, and a traveling signal in a moving mode.

Figure 3:
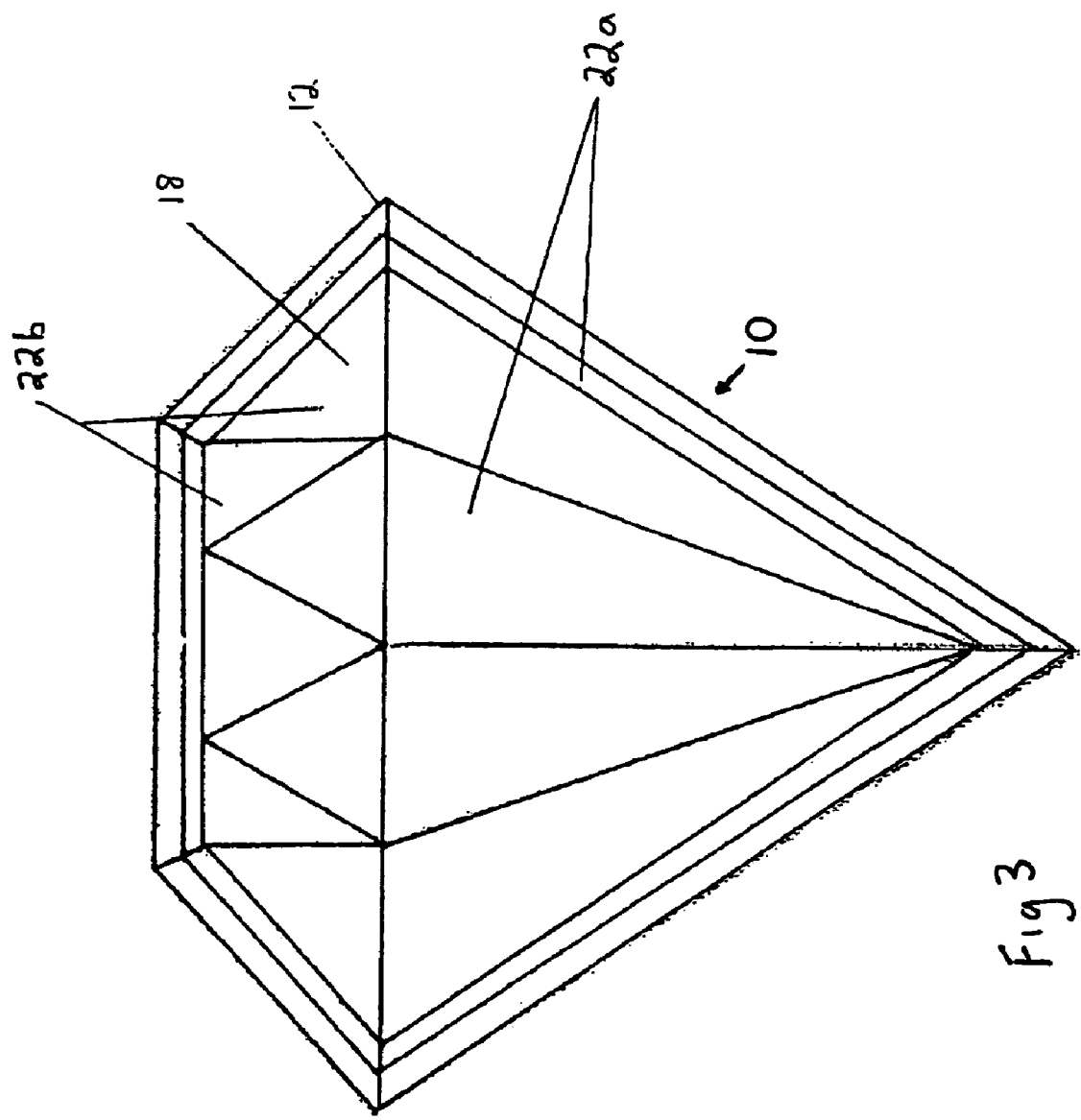
FIG. 3 is a front view of a preferred embodiment of the lens of the invention.

The preferred shape of the lens cover 18 is diamond shaped as shown in FIGS. 1 and 3 to distinguish it from the front and rear headlights. The diamond shaped V facets direct light in a 180 degree or more direction in a manner to illuminate in front and along the front side of a narrow vehicle, such as a bicycle, making it more visible to onlookers.

Figure 4:
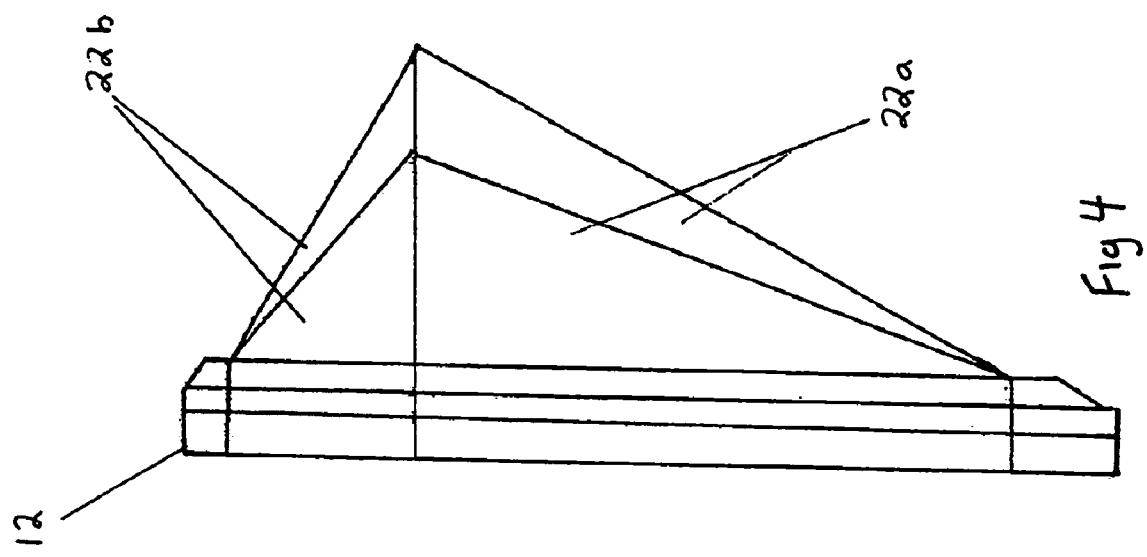
FIG. 4 is a side view of the preferred embodiment of the lens of the invention shown in FIG. 3.

FIGS. 3 and 4 are front and side views of the preferred lens cover 18 of FIG. 1. The lens cover 18 has lower facets 22a to direct concentrated beams onto the ground in front and to the front side of the vehicle to form a light pattern along the front and front side of the vehicle. The lens cover 18 upper facets 22b direct concentrated beams on top of the vehicle to illuminate the hood and cabin. This latter configuration is particularly used for heavy trucks with vertical cabs to make them more visible to vehicles driving in front of them, as well as pedestrians.

Figure 5:
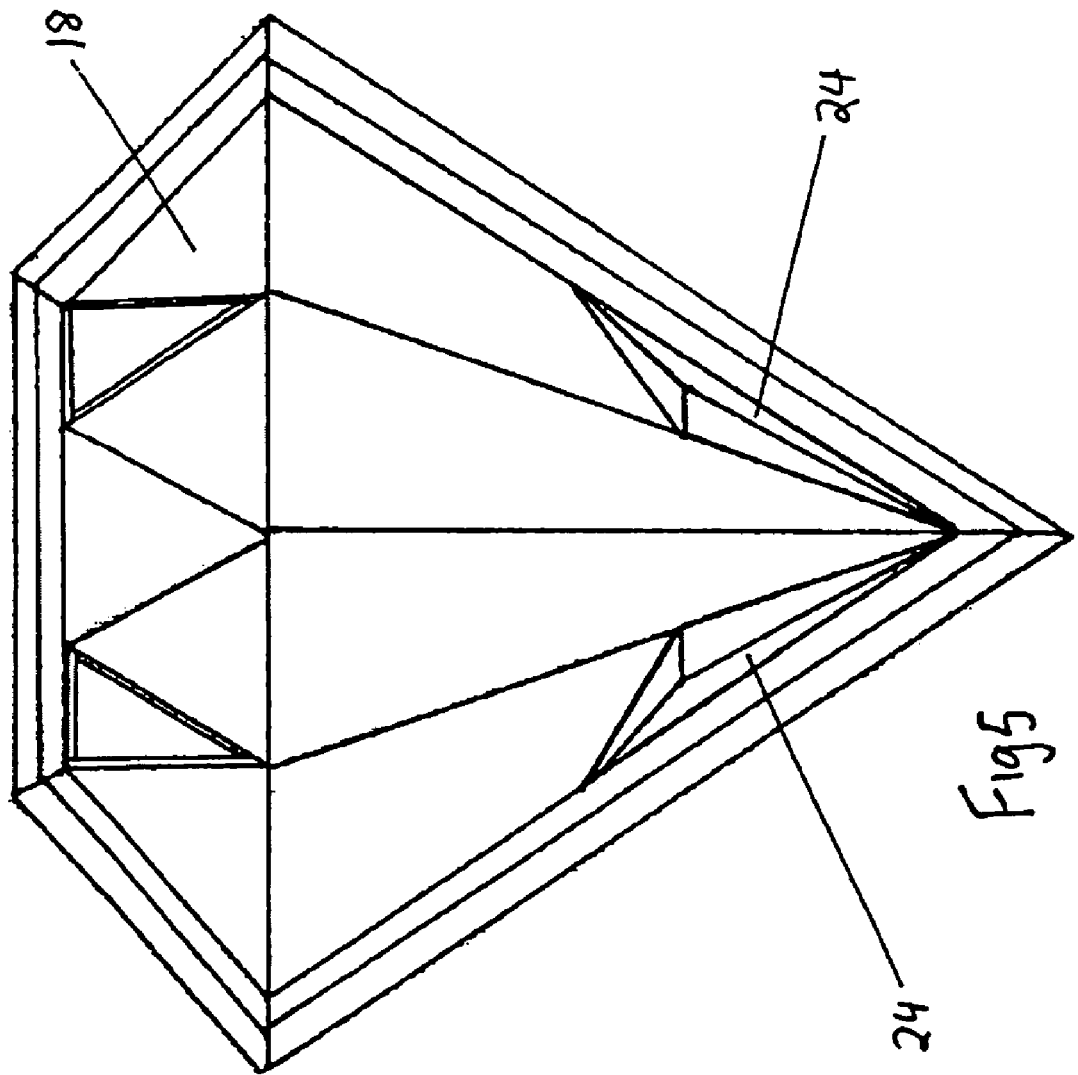
FIG. 5 is a front view of another preferred embodiment of the lens of the invention.

The facets 22a may also be used to project a pictorial light pattern, such as that shown in FIG. 7, into a crosswalk to warn pedestrians or act as an advertising sign. FIGS. 5 and 6 illustrate front and side views of the lens cover 18 facets 22a, 22b, which are structured as faceted prisms to direct focused beams as shown in FIG. 5.

Front and side views FIGS. 5 and 6 of a preferred lens cover 18, the triangle shaped lens facets 22, show additional prism lenses 24 to more truly focus and direct light from the light source in a desired direction. These prism lenses 24 may also include an etched light pattern 26 shown in FIG. 6 to project a light patterned image onto the ground as shown in FIG. 8.

The warning light system 10 may be structured as a kit to removably mount either to the front or rear of the vehicle. In a kit embodiment, the power source employed is the vehicle electrical system to selectively activate the circuit (not shown) and selectively power the lights during braking, acceleration and/or coasting. The kit 10 circuit preferably incorporates electrical means similar to that discussed in the prior art to increase the intensity of the traveling signal as the speed of the vehicle increases.

Figure 10:
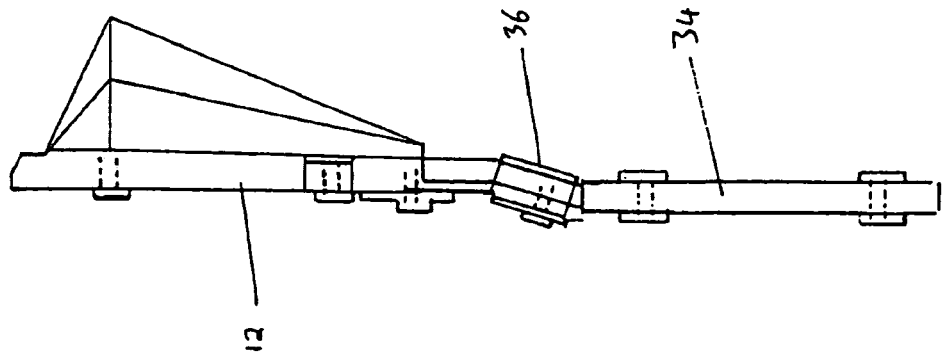
FIG. 10 is a side view of a preferred mounting bracket system shown in FIG. 10.
Figure 9:
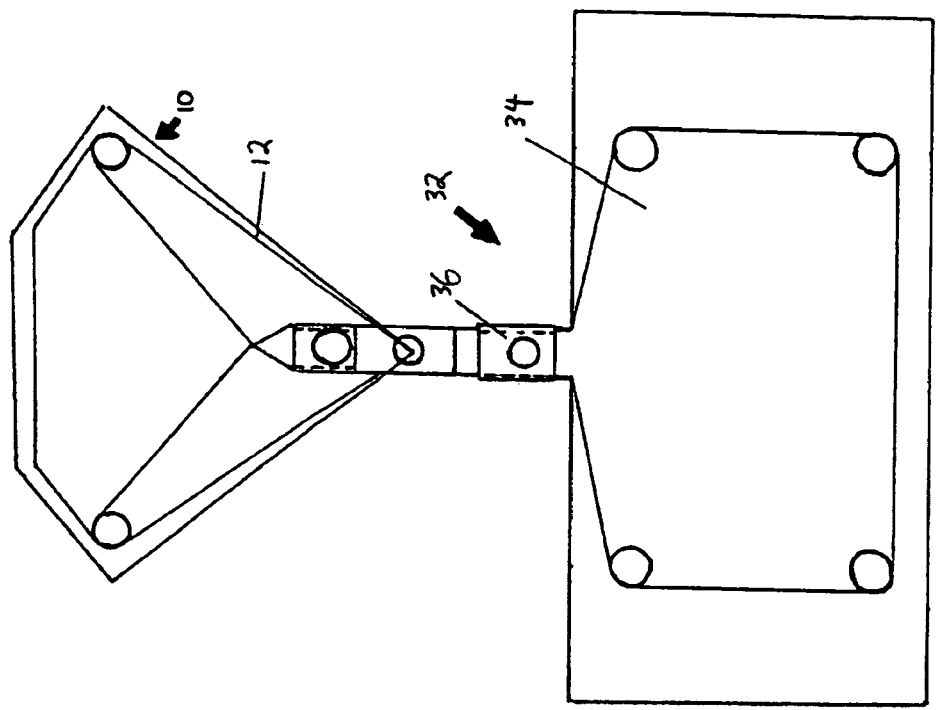
FIG. 9 is a perspective view of a preferred mounting bracket system.

FIGS. 9 and 10 are front and side views of a preferred mounting skeletal bracket system 32 structured to attach to a vehicle's front or rear license plate holder. It has a plate mount 34 adapted to bolt to a vehicle's front license plate holder. It has a slide adjustable pin push/pull lock system extender 36 attached to the warning light base 12 to elevate the warning light system 10 preferably above and to the center of the vehicle bumper to insure that it is visible from the front and sides of the vehicle. The skeletal bracket system 32 preferably is slightly angled to position the extender 36 out to clear the bumper and simultaneously extend the warning light system 10 to improve visibility.

Figures 11, 11A:
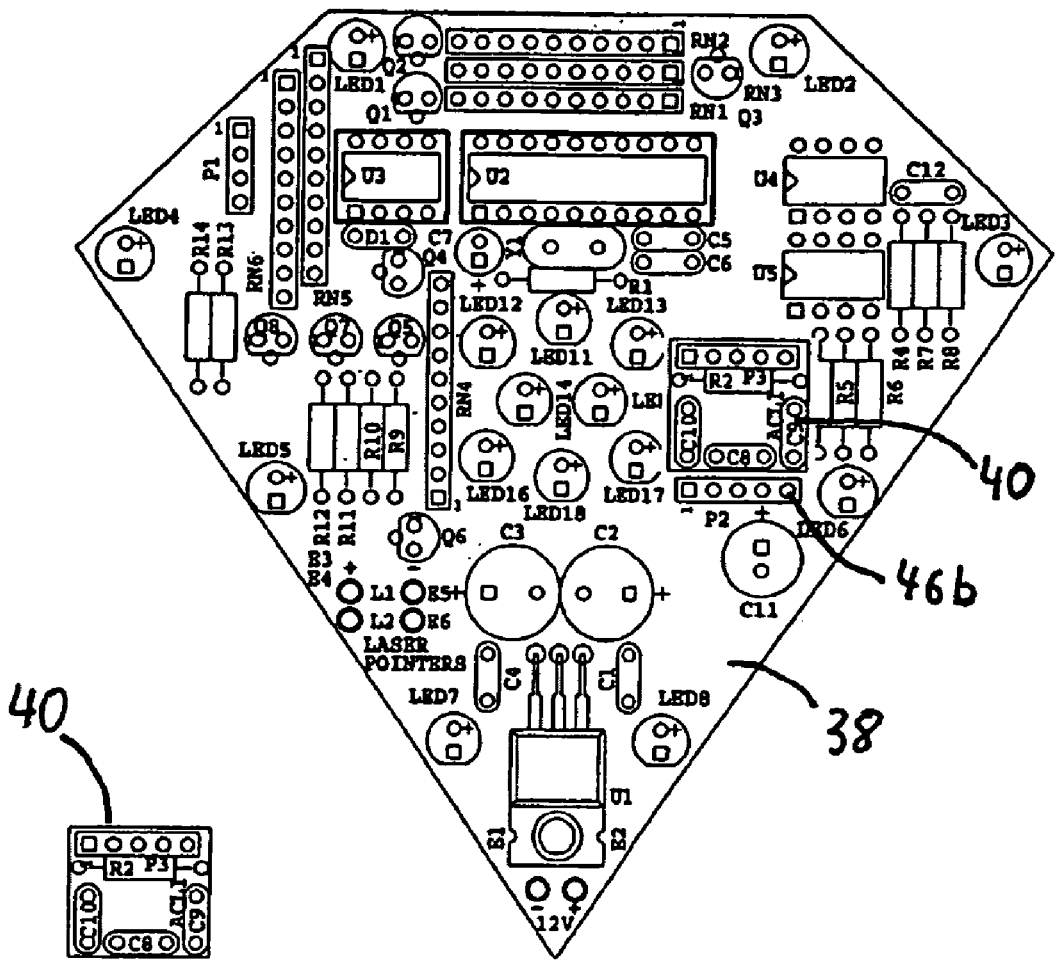
FIG. 11 is a top view of the programmable circuit board with an accelerometer.
FIG. 11a is an isolated view of the accelerometer of FIG. 11.

The above warning light system 10 may thus be modified to mount on either the front or rear of a vehicle by using a programmable circuit board 38 with an accelerometer 40 shown in FIG. 1 a FIG. 11 is a top view of the programmable circuit board 38 with an accelerometer 40 shown as the R2 P3, which plugs into P2 on the circuit board 38.

Figure 12:
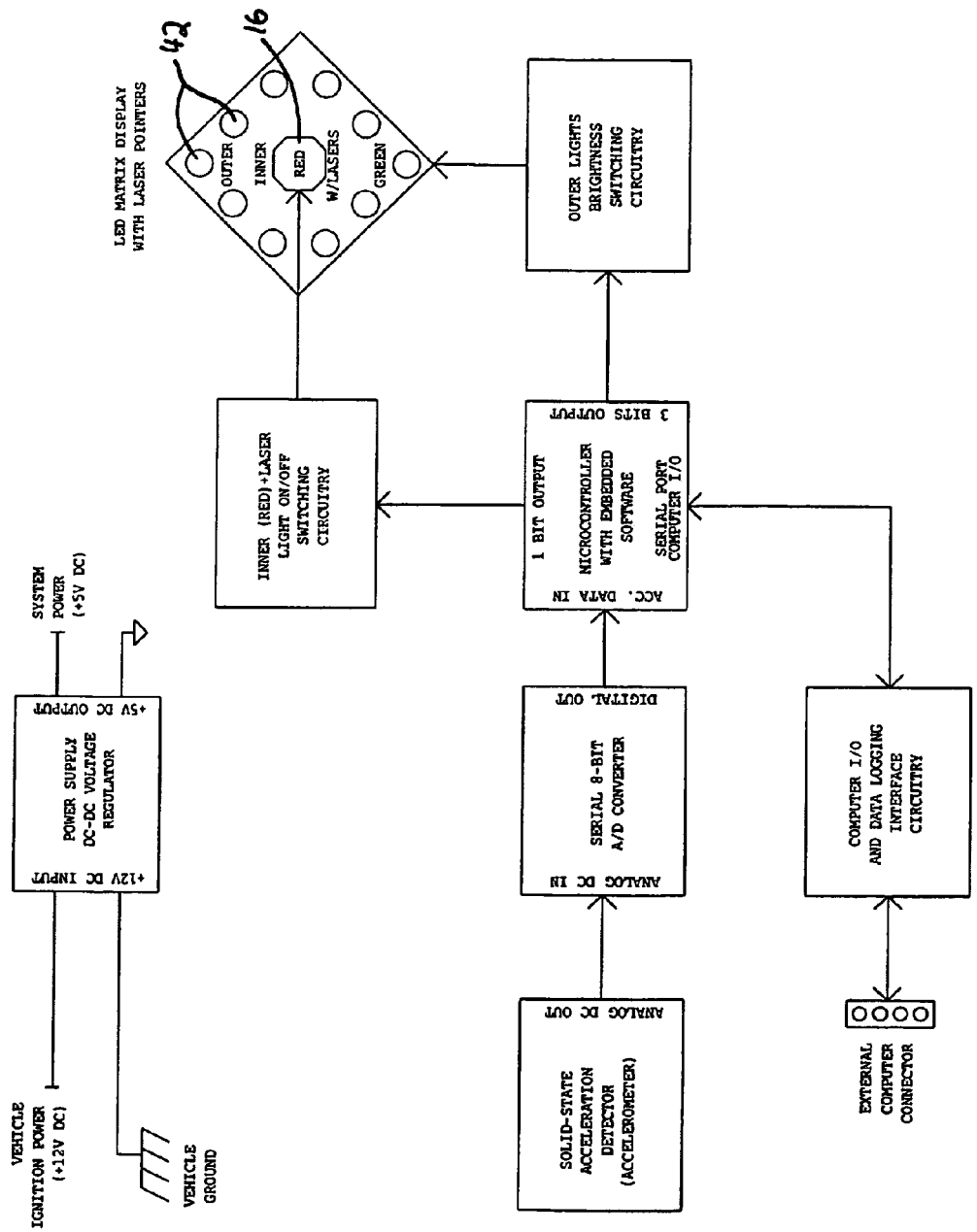
FIG. 12 is a schematic of the components for circuit board of FIG. 12.

FIG. 12 is a schematic of the components for circuit board 38 with LED lights 42 of FIG. 12. This circuit board 38 shows how a vehicles power supply is adjusted where the warning light system 10 is to be employed. As discussed above, these power supply adjustment components are removed for use with a bicycle employing its own battery power system.

Figure 13:
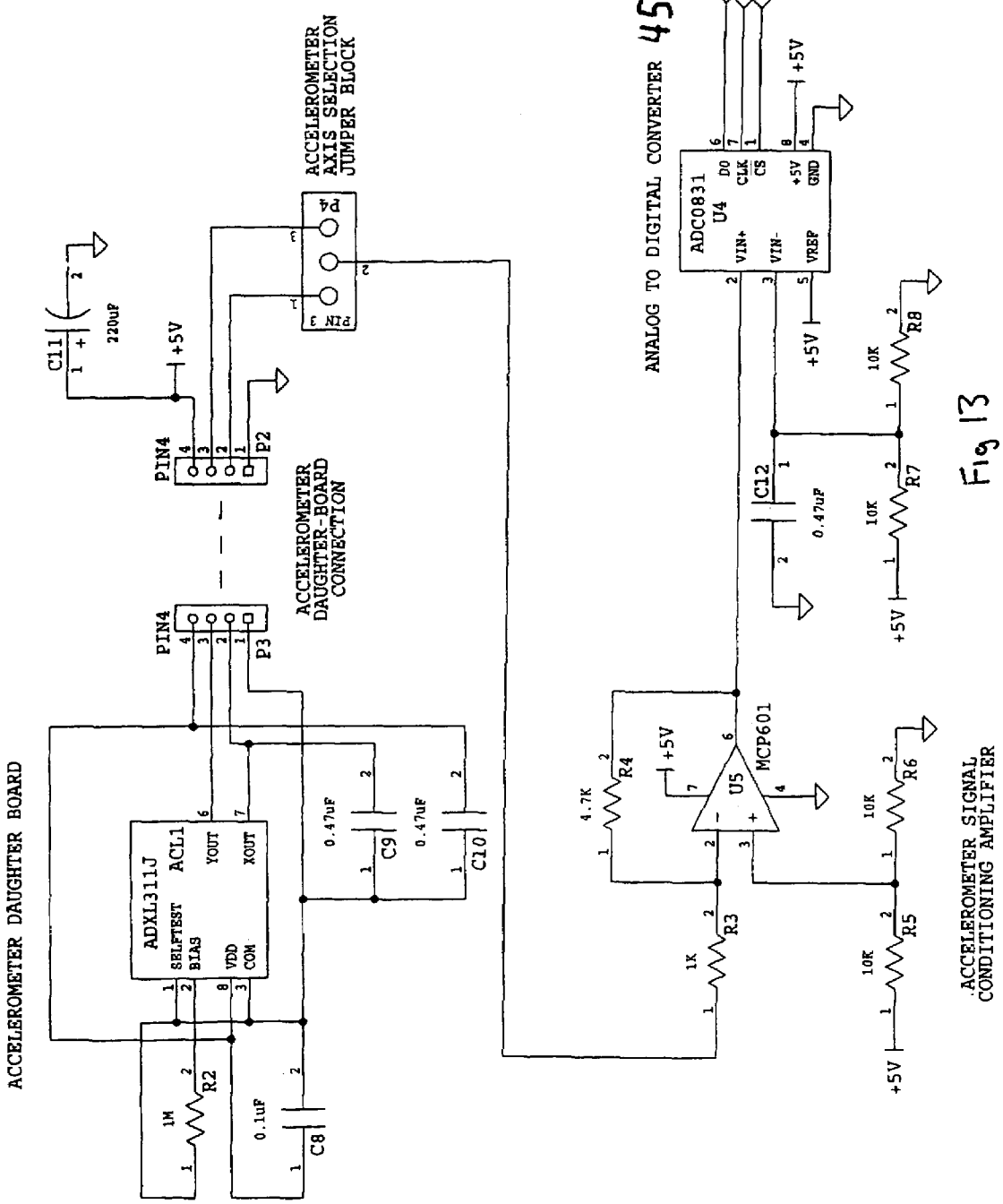
FIG. 13 is the circuit diagram from the accelerometer.

FIG. 13 is the circuit diagram of a preferred embodiment of the accelerometer daughter board 44 and analog digital converter 45. This circuit detects and controls acceleration and braking to initiate the appropriate warning lights 16, 22.

Figure 14A:
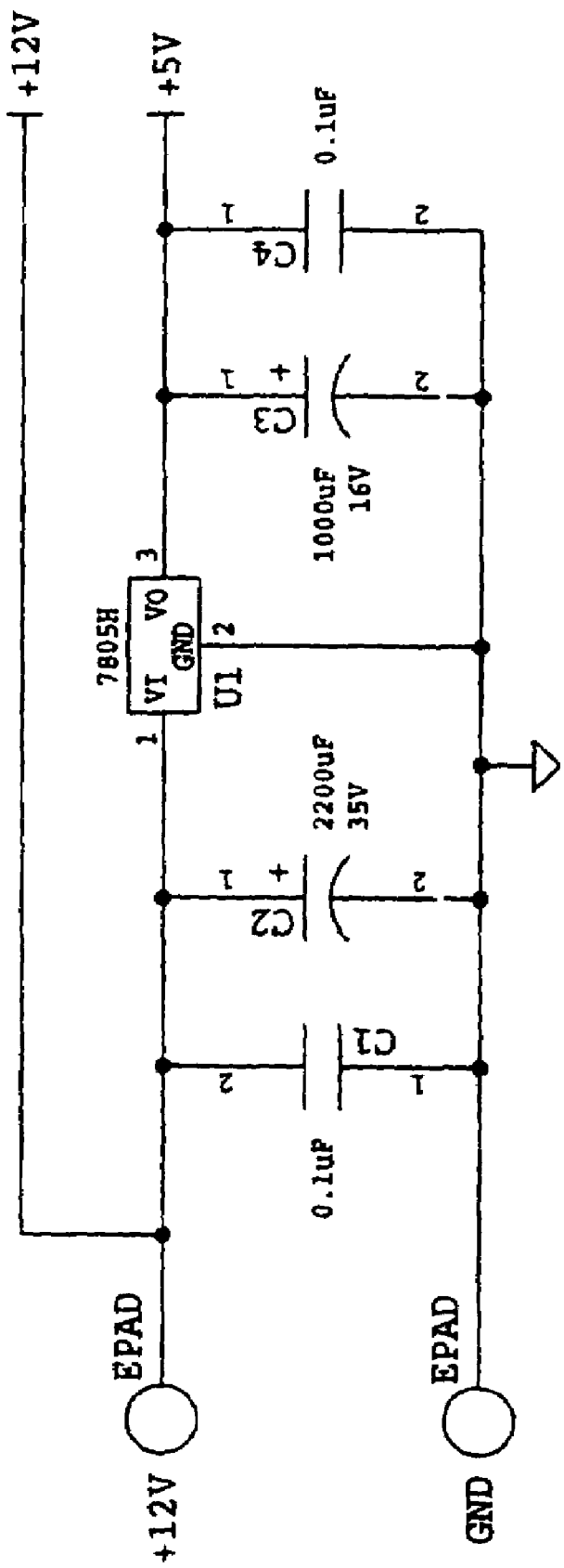
FIG. 14 is the circuit diagram from the power supply voltage regulator and micro controller.
Figure 14:
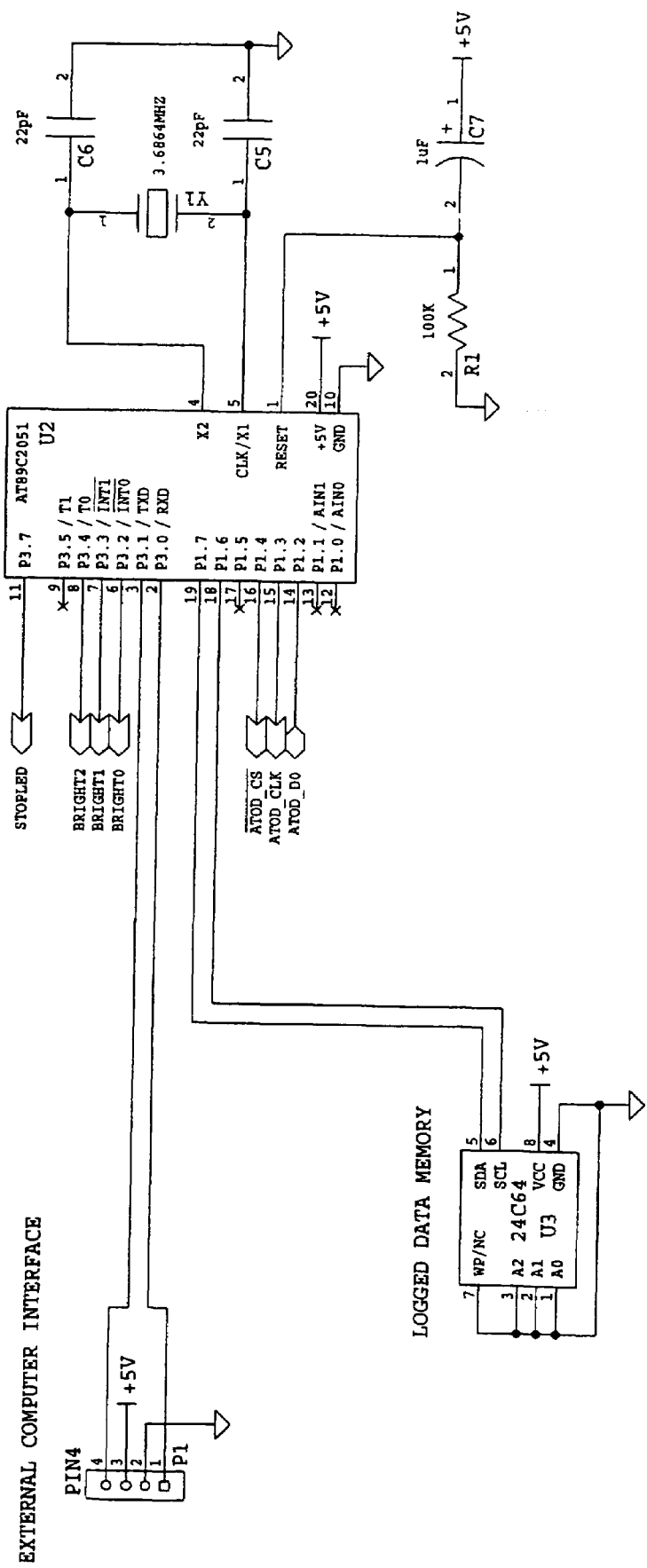

FIG. 14 is the circuit diagram for the power supply voltage regulator 46 and micro controller 48 of preferred circuit board 38.

Figure 15A:
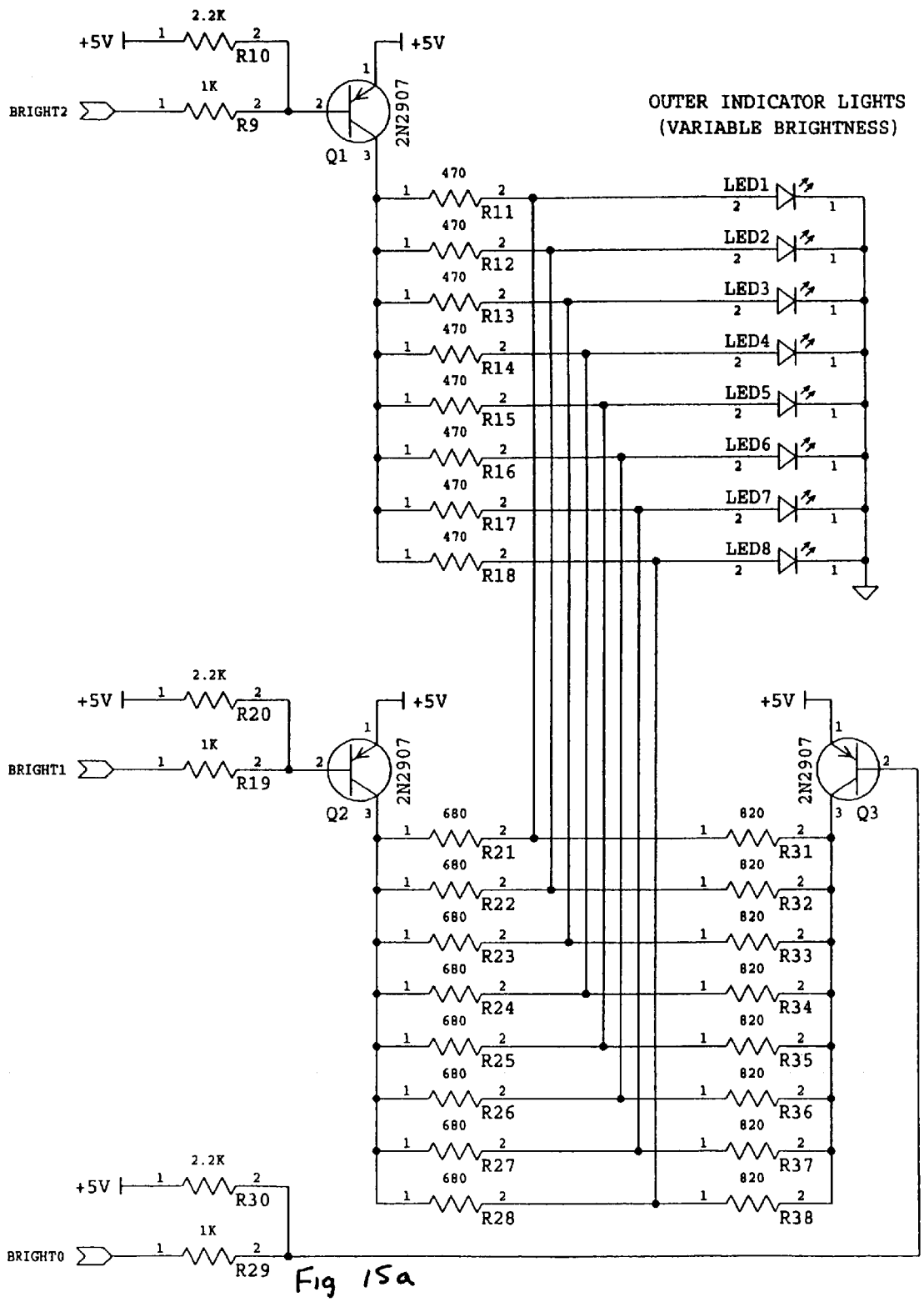
FIG. 15 is a circuit diagram of the circuit controlling the lights.
Figure 15:
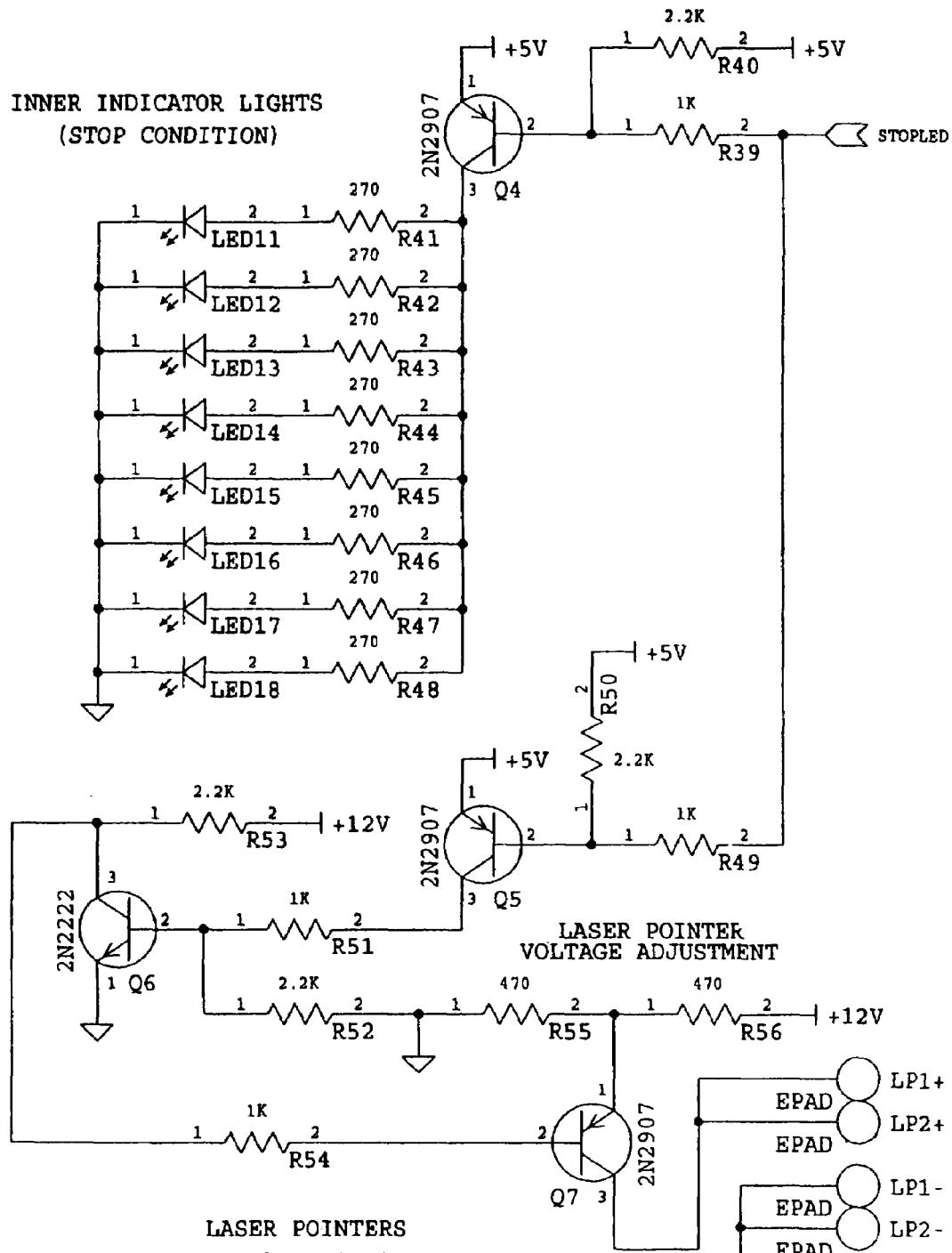

FIG. 15 is a circuit diagram of the circuit controlling the lights 16, 22.

Figure 16:
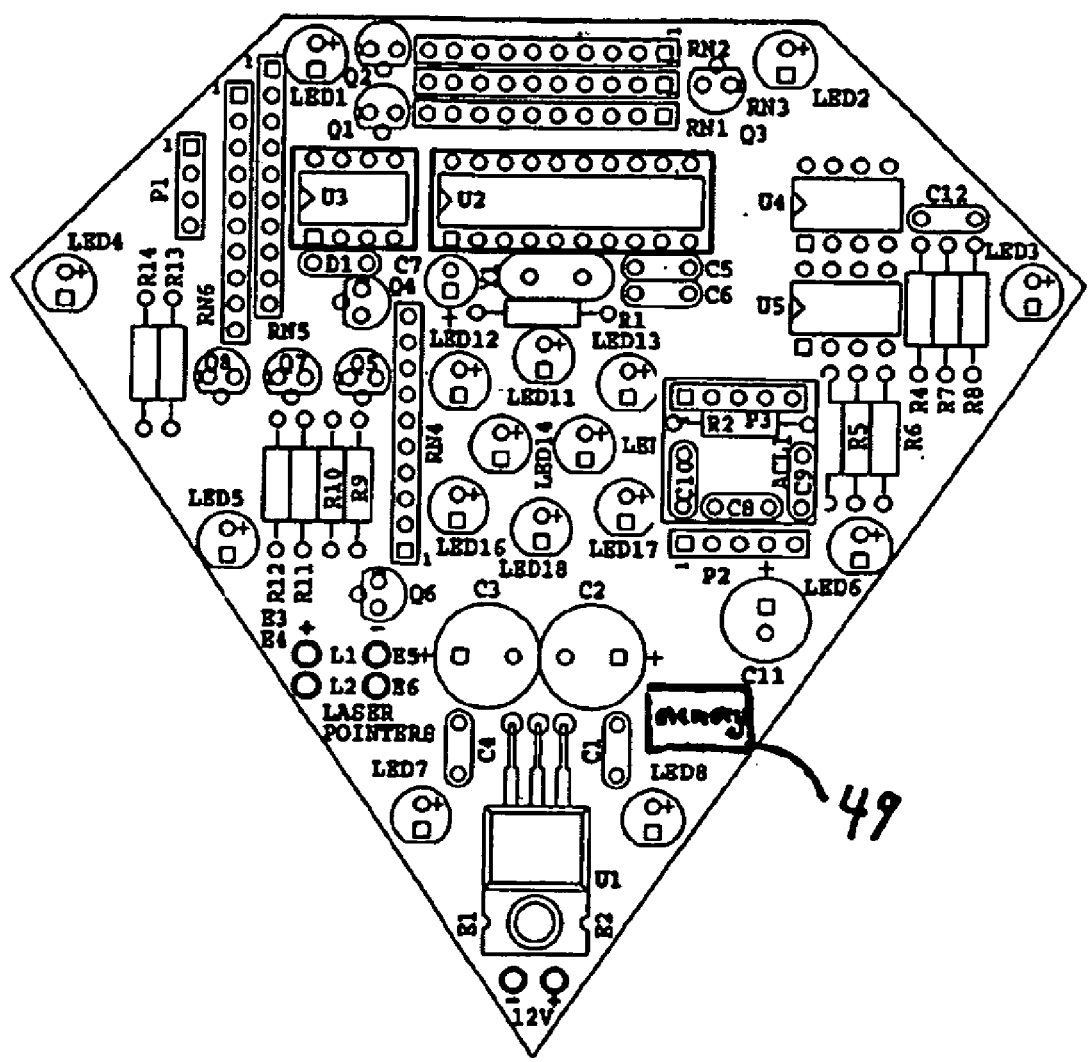
FIG. 16 is a circuit diagram of a black box control circuit.

FIG. 16 is a circuit diagram of a black box control circuit 46 with a memory storage unit 49 recording the vehicles angular momentum during travel.

Figure 17:
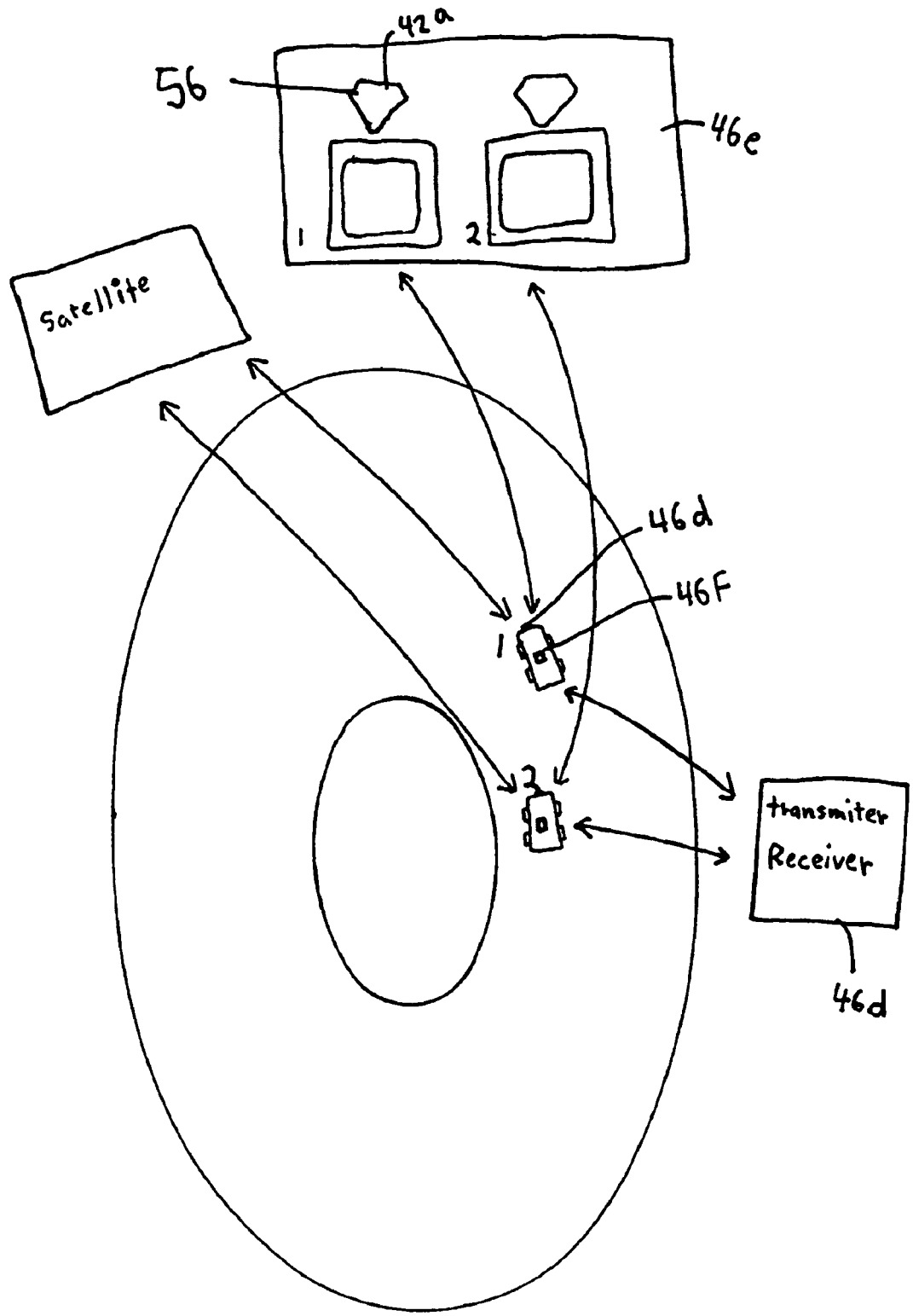
FIG. 17 is an embodiment of FIG. 16 adapted with a global positioning and transmitter/receiver.

FIG. 17 is a perspective view of a race track viewing screen 54 operably associated with signals transmitted from the black box control circuit 46 components of units placed on a number of race cars. The black box control circuit 46 embodiment has a GPS positioning element (not shown) to record the vehicle's position. It also has an accelerometer 40 similar to that shown in FIG. 11, and a gravitometer 46b comprised of a second accelerometer 40 aligned at right angles to the first accelerometer to detect angular sliding motion. A circuit board 38 combines the electronic signals of the accelerometer 40 and gravitometer 46b for activation of the respective lights 16, 22, which includes a warning light 42a to advise observers to the car losing traction when going around corners. A transmitter 46c is usually associated with the accelerometer 40, gravitometer 46b and a GPS positioning element 46a to transmit the vehicle's speed, position, and gravitational turn forces. A corresponding receiver 46d than receives and displays these signals on a display board 46e. Preferably, these display boards 46e are positioned for viewing by race fans or other spectators so that they are made aware of the actual forces exerted on a race car during a race. The display units may also include video signals as well as indicator lights 56 showing how the vehicles accelerate and brake along the course. The embodiment is particularly of use to fans wishing to view the driving forces on a race car during a race.

In one preferred embodiment, the display boards 46e respond to signals from each race car and corresponding display the acceleration and positioning of each car in the race. An alternative display in this regard is a video image projection generated by a camera 46f mounted in each race car so that the display boards 46e not only display the acceleration and positioning of each car, but a view from the car as well.

Figure 18:
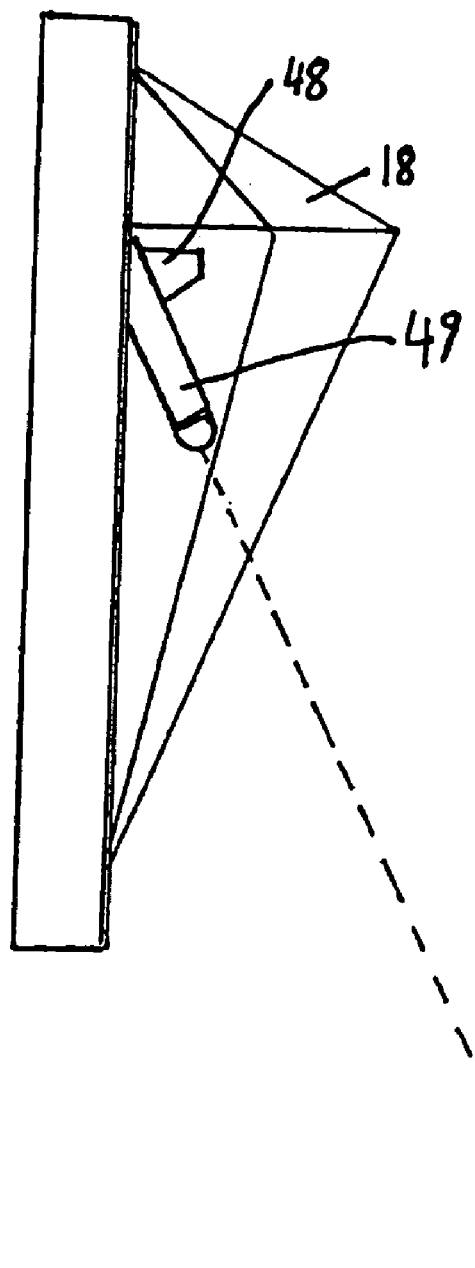
FIG. 18 is a perspective view of an embodiment with a laser pen.

FIG. 18 is a preferred embodiment, the lens cover 18 or mounting bracket 47 includes mountings 48 for interchangeable laser pens 49 with patterned lenses 50 to project an advertising slogan that illuminates the ground in front of the stopped vehicle with a message. The laser pens 49 are activated by a circuit (not shown), which responds to a signal generated by an outside transmitter (not shown) mounted near a stop sign or stop light, such that the laser pens 49 project advertising images in cross-walks in front of the vehicle. These light projection messages generated by the laser pens 49 may be multi-colored or patterned to suit the needs of an advertiser, or user.

Figure 19:
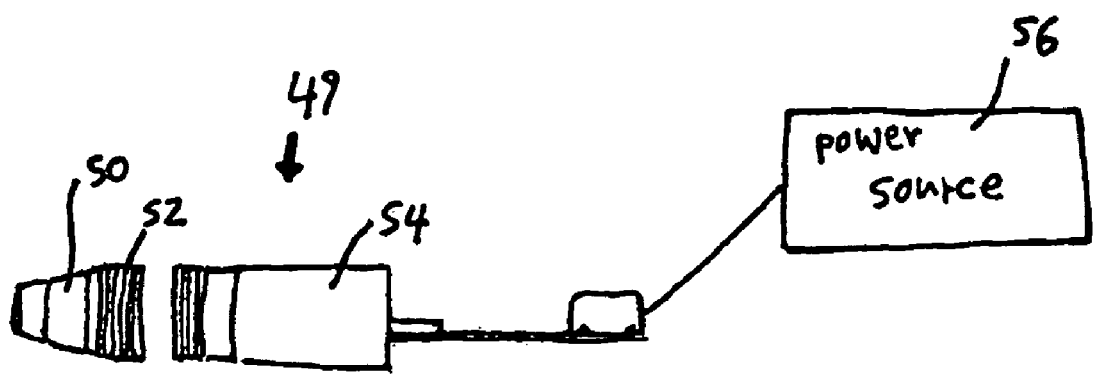
FIG. 19 is a perspective view of a preferred advertising pen embodiment.

FIG. 19 is a perspective view of an embodiment with a laser pen 49. This may include piezo crystals within its circuitry to cause an electric current in response to mechanical force to generate electricity to activate the laser image to project onto the ground. It has a removable cap 52 preferably with interchanging lenses 50, which attach to the barrel 54 of the laser pen 49 positioned over the laser beam. The laser pen 49 may include a battery (not shown) stored within the barrel 54 or may be associated with the vehicles power source 56. The laser pens 49 may have fixed lenses with a fixed design, which may be periodically replaced with other fixed lens laser pens 49 with different messages.

The above description and specification should not be construed as limiting the scope of the claims but as merely providing illustrations of some of the presently preferred embodiments of this invention. Thus, the scope of the claims recites those features deemed essential to the invention.

I claim:

1. A vehicle mounted acceleration/de-acceleration warning light system comprising:
   a. a base with attachment structure to secure either to the front or rear of a vehicle,
   b. a reflective mirror with reflective surfaces attached to the base,
   c. a light source attached to the base and positioned to direct light onto the reflective mirror surfaces for reflection and direction,
   d. a lens cover with facets aligned with the reflective mirror surfaces to direct the light from the light source into a warning light pattern onto the ground or at a desired point near or onto the vehicle, said lens cover projecting sufficiently from the base to be visible from the sides and front of the vehicle,
   e. a power source associated with the light source, and
   f. a reversible control circuit associated with the brakes and the wheels to selectively activate the light source when the vehicle is de-accelerating or accelerating by providing a braking signal in a vehicle braking mode, and a traveling signal in a vehicle traveling mode, wherein the control circuit signal selected is dependant upon whether the warning light system is mounted on the front or rear of the vehicle.

2. A vehicle mounted acceleration/de-acceleration warning light system according to claim 1, wherein the circuit associated with the light source generates different flashing sequences and/or colors for vehicle braking and vehicle traveling.

3. A vehicle mounted acceleration/de-acceleration warning light system according to claim 2, wherein the light source comprises a plurality of electronic digital lights.

4. A vehicle mounted acceleration/de-acceleration warning light system according to claim 1, wherein the light source has at least two different wavelength frequencies each separately associated with the brakes and wheels to provide a braking signal different from the traveling signal.

5. A vehicle mounted acceleration/de-acceleration warning light system according to claim 4, wherein the wavelength frequency for braking is red, and the wavelength frequency for traveling is green.

6. A vehicle mounted acceleration/de-acceleration warning light system according to claim 1, wherein the facets of the lens cover direct light beams onto the ground to form a pool of light along the front and front sides of the vehicle when mounted on the front, and a pool of light along the rear and rear sides of the vehicle when mounted on the rear.

7. A vehicle mounted acceleration/de-acceleration warning light system according to claim 1, wherein the lens cover has a distinctive shape to distinguish it from a vehicle's front headlights or rear brake lights.

8. A vehicle mounted acceleration/de-acceleration warning light system according to claim 7, wherein the lens cover is diamond shaped with facets to direct light along the front and front side or rear and rear sides of the vehicle.

9. A vehicle mounted acceleration/de-acceleration warning light system according to claim 1, including an activation switch and programmed circuit associated with the lights to selectively activate the lights in a desired pattern and/or color frequency.

10. A vehicle mounted acceleration/de-acceleration warning light system according to claim 1, wherein the base is constructed of a magnetic moldable material adapted to conform to the shape of the front or rear ends of the vehicle and adhere to ferromagnetic surfaces.

11. A vehicle mounted acceleration/de-acceleration warning light system according to claim 10, wherein the base of the warning light system includes structure to secure the warning light system to the license plate holders of a vehicle with extenders to position the warning light system at a desired height and distance from the front or rear of the vehicle.

12. A vehicle mounted acceleration/de-acceleration warning light system according to claim 1, wherein the power source is a battery.

13. A vehicle mounted acceleration/de-acceleration warning light system according to claim 1, wherein the intensity of the traveling signal of a front mounted warning light system increases as the speed of the vehicle increases.

14. A vehicle mounted acceleration/de-acceleration warning light system according to claim 1, wherein the lens cover is structured as a prism to focus and direct light from the light source.

15. A vehicle mounted acceleration/de-acceleration warning light system according to claim 1, wherein the lens cover is replaceable and can be interchanged with other lens colors and warning light patterns to suit the preference of a user.

16. A vehicle mounted acceleration/de-acceleration warning light system according to claim 1, including a first accelerometer and a second accelerometer aligned at right angles to the first accelerometer to detect the vehicle's angular sliding motion associated with the control circuit to activate display lights to advise observers if the vehicle is losing traction when going around corners.

17. A vehicle mounted acceleration/de-acceleration warning light system according to claim 16, including a GPS positioning element to determine the vehicle's position, and a transmitter associated with the accelerometers and GPS positioning element to transmit signals of the vehicle's speed, position, and gravitational turn forces to a corresponding receiver which has a display for showing this information.

18. A vehicle mounted acceleration/de-acceleration warning light system according to claims 17, including a video camera mounted to the vehicle to send video signals to the display to show a view from the vehicle.

19. A vehicle mounted acceleration/de-acceleration warning light system according to claim 1, including laser pens and mountings associated with the base or lens cover for attaching interchangeable laser pens with patterned lenses to project an advertising slogan onto the ground in front of a stopped vehicle.

20. A vehicle mounted acceleration/de-acceleration warning light system according to claim 19, wherein the laser pens accommodate removable interchanging lenses of different patterns and colors.

21. A vehicle mounted acceleration/de-acceleration warning light system according to claim 20, including at least one advertising or messaging signal transmitter mounted near a stop sign or stop light, and a corresponding signal receiver mounted to the base and associated with the control circuit to activate the laser pens to project advertising images on the ground or in cross-walks in front of a stopped vehicle.

* * * * *